United States Patent [19]

Peterson et al.

[11] Patent Number: 5,067,095
[45] Date of Patent: Nov. 19, 1991

[54] SPANN: SEQUENCE PROCESSING ARTIFICIAL NEURAL NETWORK

[75] Inventors: William M. Peterson, Scottsdale; Howard C. Anderson, Tempe; Robert Leivian, Chandler; Sidney C. Garrison, Tempe, all of Ariz.

[73] Assignee: Motorola Inc., Schaumburg, Ill.

[21] Appl. No.: 462,203

[22] Filed: Jan. 9, 1990

[51] Int. Cl.$^5$ .............................................. G06G 7/12
[52] U.S. Cl. ......................................... 395/24; 395/22
[58] Field of Search ................ 364/513, 807; 307/201; 357/23.5; 382/15; 381/43

[56] References Cited

U.S. PATENT DOCUMENTS

| | | | |
|---|---|---|---|
| 4,773,024 | 9/1988 | Faggin et al. | 364/513 |
| 4,802,103 | 1/1989 | Faggin et al. | 364/513 |
| 4,805,225 | 2/1989 | Clark | 382/15 |
| 4,937,872 | 6/1990 | Hopfield et al. | 381/43 |
| 4,956,564 | 9/1990 | Holler et al. | 307/201 |
| 4,961,005 | 10/1990 | Salam | 307/201 |
| 4,969,021 | 11/1990 | Thakoor et al. | 357/23.5 |

OTHER PUBLICATIONS

Lippmann, "An Introduction to Computing with Neural Nets", *IEEE ASSP Magazine*, Apr. 1987, pp. 4–22.
Hecht-Nielsen, "Neurocomputing Picking the Human Brain", *IEEE Spectrum*, Mar. 1988, pp. 36–41.

*Primary Examiner*—Allen R. MacDonald
*Assistant Examiner*—Joyner Roger S.
*Attorney, Agent, or Firm*—Robert D. Atkins; Michael D. Bingham

[57] ABSTRACT

An artificial neural network is provided using a modular, self-organizing approach wherein a separate neural field is contained within each module for recognition and synthesis of particular characteristics of respective input and output signals thereby allowing several of these modules to be interconnected to perform a variety of operations. The first output and second input of one module is respectively coupled to the first input and second output of a second module allowing each module to perform a bi-directional transformation of the information content of the first and second input signals for creating first and second output signals having different levels of information content with respect thereto. In the upward direction, the first low-level input signal of each module is systematically delayed to create a temporal spatial vector from which a lower frequency, high-level first output signal is provided symbolic of the incoming information content. Since the first output signal contains the same relevant information as the first input signal while operating at a lower frequency, the information content of the latter is said to be compressed into a first high-level output signal. In the downward direction, a second output signal having a low-level of information content is synthesized from a second input signal having a high-level of information content. The second input signal is the best prediction of the first output signal available from the knowledge base of the module, while similarly the second output signal is the prediction of the first input signal.

34 Claims, 8 Drawing Sheets

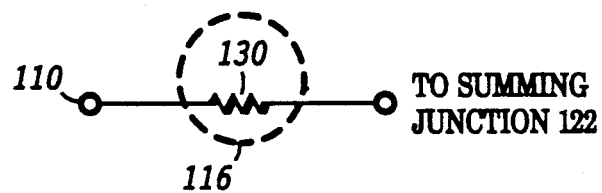
FIG. 5A
FIG. 5B
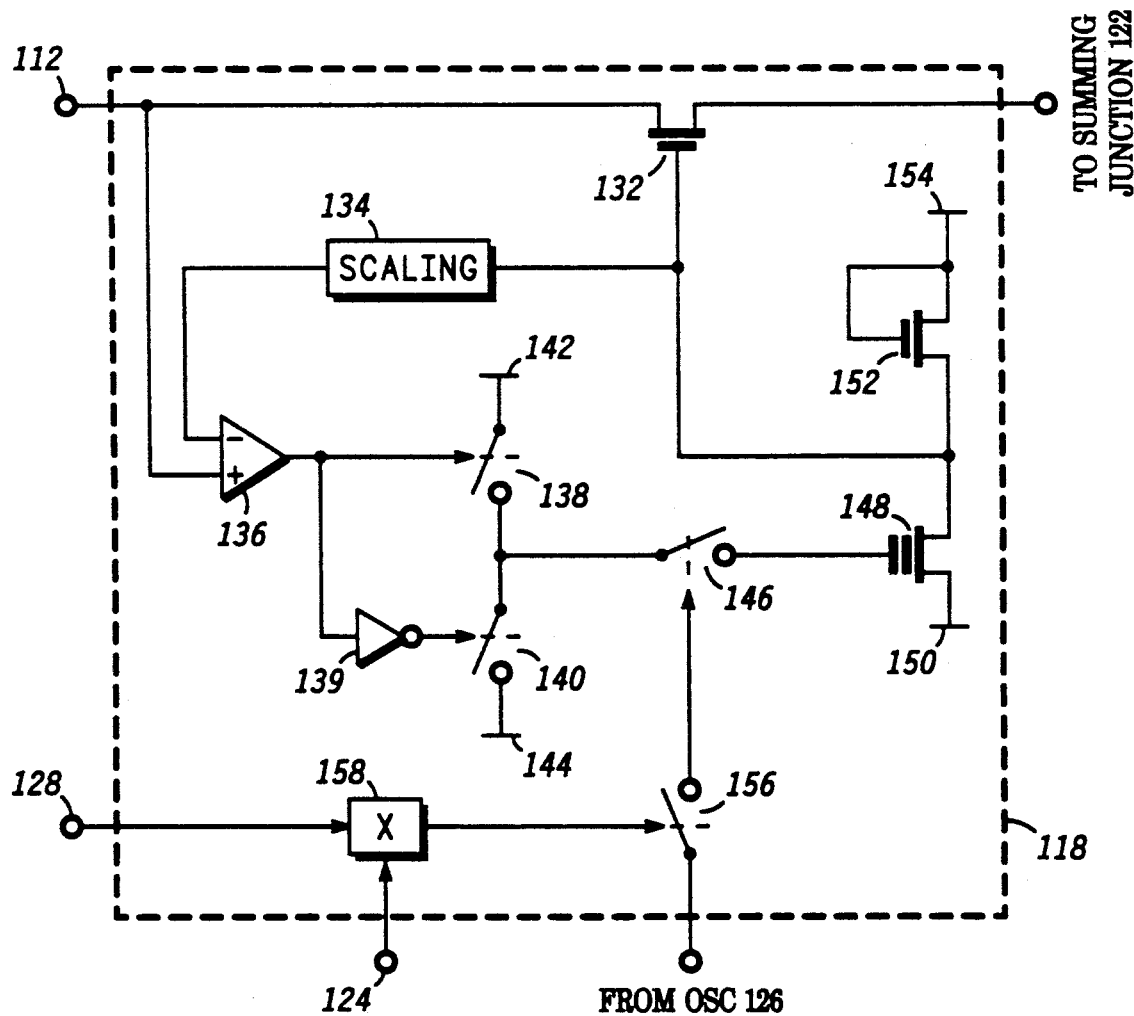

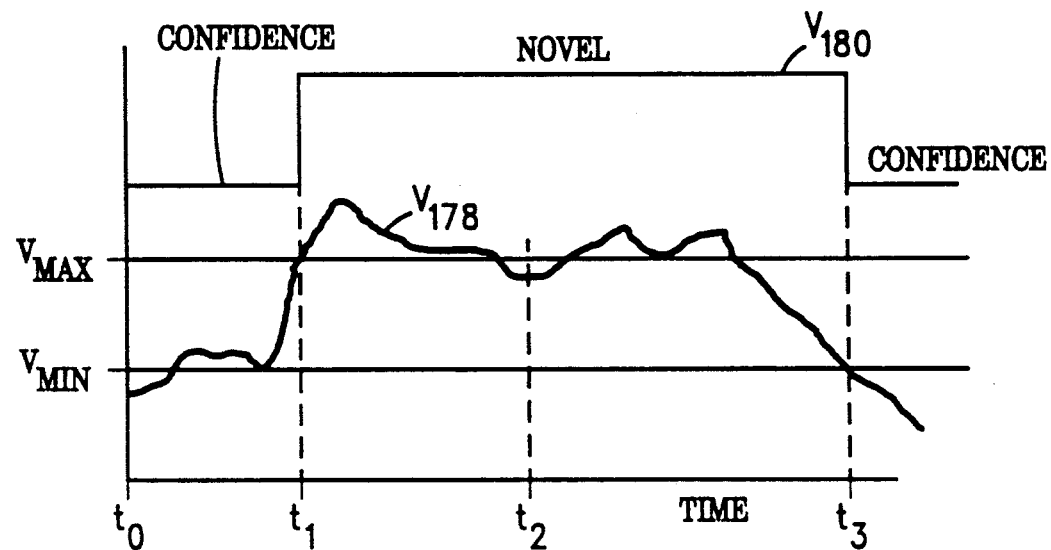
FIG. 8
FIG. 10
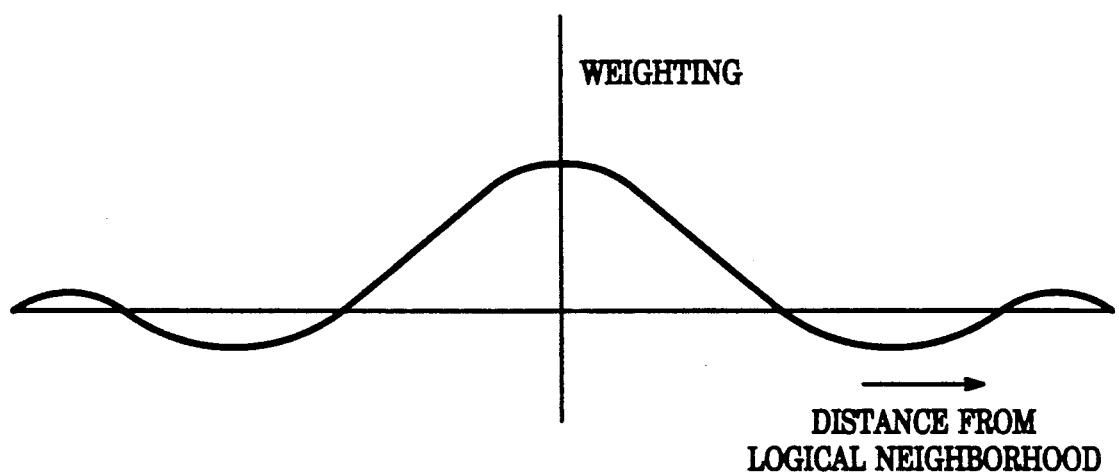

SPANN: SEQUENCE PROCESSING ARTIFICIAL NEURAL NETWORK

FIELD OF THE INVENTION

The present invention relates in general to neural networks and, more particularly, to a bi-directional, hierarchical neural network comprising a plurality of interconnected modules wherein each module builds upon predetermined levels of learning and recognition by compressing the information content of upward propagating signals while decompressing downward propagating signals for providing first and second output signals symbolic of the respective incoming information.

BACKGROUND OF THE INVENTION

A biological neuron is a single nerve cell responsive to stimuli through weighted inputs known as synapses. The weighted stimuli are summed and processed through a particular non-linearity associated with the neuron. The output of the neuron may then be connected to the synapses of other neurons forming an interconnection of neurons known as a neural network, the latter of which possesses certain desirable properties including the ability to learn and recognize information patterns in a parallel manner.

Technologists have long studied the advantageous nature of the biological neuron in an attempt to emulate its behavior in electronic circuitry. As indicated, some of the advantages of the neural network include the learning and recognition of patterns and shapes. The neural network may be taught a particular pattern and later be called upon to identify the pattern from a distorted facsimile of the same pattern. Unlike conventional signal processing techniques wherein the solution is programmed with a predetermined algorithm, the recognition technique of the neural network may be learned through an iterative process of applying repeated samples of an input signal, comparing the output signal thereof with the desired response and adjusting the synaptic weights until the desired response is achieved.

Another advantageous feature of the neural network is the inherent parallel processing offering real-time execution without the classic von Neumann bottleneck associated with conventional serial processing techniques, i.e., digital signal processing and general microprocessor based applications. In general, neural networks are well suited for applications wherein the solution algorithm is not known or difficult to implement, or where conventional processing techniques are too slow. Notably, neural networks typically are not high precision devices, thus, a certain degree of error is generally present in the output signal.

Conventional neural networks typically comprise a predetermined, often rigid structure, wherein the network is designed with a particular application in mind, i.e., visual pattern recognition or speech recognition. Such neural networks work well for learning and recognizing static patterns to provide a higher-level output signal as compared to the input signal thereof, but usually fail to provide satisfactory results when confronted with a spatial input signal operating in a temporal environment. Furthermore, conventional neural networks typically require special organizational steps and new training sets for each new application. The need for the predefined, highly specialized neural structure and initialization data sets limits the versatility of the neural network. A modular approach would be more desirable wherein a single-level neural field could be designed with some functional flexibility whereby several modules may be easily interconnected to perform a variety of learning and recognition operations. Moreover, it would also be desirable for the neural network to re-synthesize the input signal from the output signal thereby recreating the original lower-level information.

Hence, there is a need for a hierarchical, self-organizing neural network for use in general purpose, bi-directional recognition and synthesis processes wherein a first input signal having a low-level of information content is recognized for providing a first output signal having a comparatively high-level of information content while, in the opposite direction, a second low-level output signal is synthesized from a second high-level input signal.

SUMMARY OF THE INVENTION

Accordingly, an objective of the present invention is to advance the art of neural networks.

A further objective of the present invention is to provide a neural network for recognizing an input signal having a low-level of information content and providing an output signal having a comparatively high-level of information content while developing a knowledge base therefrom.

Another objective of the present invention is to provide a neural network for synthesizing a second output signal having a low-level of information content from a second high-level input signal through the knowledge base of the network.

Yet another objective of the present invention is to provide a bi-directional neural network utilizing a hierarchical structure of interconnected modules wherein the first output and second input of one module are respectively coupled to the first input and second output of another module whereby the recognition differential per module may be reduced for increasing resolution thereof without limiting the overall knowledge base.

In accordance with the above and other objectives there is provided a neural network responsive to first and second input signals applied at first and second inputs for providing first and second output signals at first and second outputs symbolic of the information content thereof. The neural network comprises a first circuit responsive to the first output signal for providing a signal symbolic of the prediction of the first input signal. A second circuit includes first and second outputs and first and second inputs coupled for receiving the first input signal and the signal symbolic of the prediction of the first input signal, respectively, for monitoring the degree of correlation therebetween wherein the first input signal is gated through to the first output for a low degree of correlation or alternately the signal symbolic of the prediction of the first input signal is gated through to the first and second outputs for a high degree of correlation. The second output of the second circuit is also coupled to the second output of the neural network. A third circuit progressively delays the first output signal of the second circuit for providing a spatial vector thereof at a plurality of tap points, while a fourth circuit is responsive to the spatial vector of the first output signal of the second circuit and to the second input signal for synthesizing the first output signal symbolic of the information content of the first and second input signals.

In another aspect, the present invention comprises a plurality of serially coupled modules each being responsive to first and second input signals applied at first and second inputs for providing first and second output signals symbolic of the information content thereof, wherein the first output and the second input of a first one of the plurality of serially coupled modules are respectively coupled to the first input and the second output of a second one of the plurality of serially coupled modules for increasing the recognition and synthesis capacity thereof.

BRIEF DESCRIPTION OF DRAWINGS

FIGS. 5A and 5B are a pair of schematic and block diagrams illustrating one embodiment of the non-adaptive and adaptive synapses of a neuron;

FIG. 8 is a pair of waveform plots showing confidence and novel states of the confidence layer of FIG. 7;

FIG. 10 is a waveform plot illustrating the synaptic weighting distribution of the neuron field of the feature map of FIG. 9;

DETAILED DESCRIPTION OF THE PREFERRED EMBODIMENT

Figure 1:
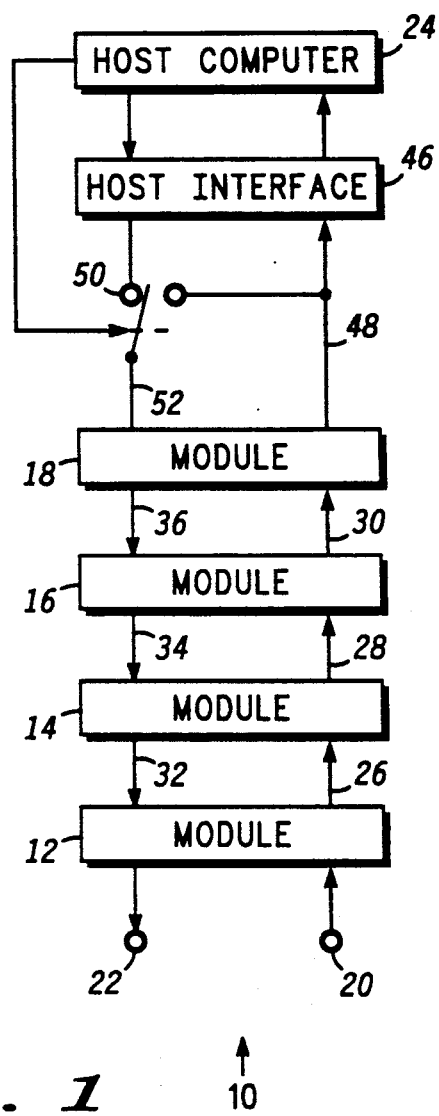
FIG. 1 is a simplified block diagram illustrating the preferred embodiment of the present invention.

The preferred embodiment of the present invention is a modular approach to an artificial neural network wherein a plurality of modules may be interconnected for performing a variety of operations. Referring to FIG. 1, there is shown sequence processing artificial neural network (SPANN) 10 comprising modules 12, 14, 16 and 18 interconnected between input 20 and output 22 and host computer 24. Input 20 is coupled to the first input of module 12, while the first outputs of modules 12, 14 and 16 are coupled to the first inputs of modules 14, 16 and 18, respectively, through conductors 26, 28 and 30. Likewise, the second outputs of modules 14, 16 and 18 are coupled to the second inputs of modules 12, 14 and 16 through conductors 32, 34 and 36, respectively, and the second output of module 12 is coupled to output 22. The first output of module 18 is coupled through host interface 46 via conductor 48 to the first input of host computer 24, while the first output of host computer 24 is coupled through host interface 46 to the first terminal of switching circuit 50. The second terminal of switching circuit 50 is coupled to the second input of module 18 via conductor 52, while the third terminal is coupled to conductor 48. Host computer 24 also includes a second output coupled to the control input of switching circuit 50 for controlling the contact closure thereof.

The first output and second input of one module, say module 12, are respectively coupled to the first input and second output of a second module, say module 14, allowing each module to perform a bi-directional transformation of the information content of the first and second input signals for creating first and second output signals having different levels of information content with respect thereto. In the upward direction, the first low-level input signal of each module is systematically delayed for creating a temporal spatial vector from which a lower frequency, high-level first output signal is provided symbolic of the incoming information content. The number of elements of the spatial vector of the first input signal and the temporal spacing therebetween determines the amount of history used to recognize the first output signal and, thus, provides a simple adjustment for customizing the transformation within the module. Since the first output signal contains the same relevant information as the first input signal while operating at a lower frequency, the information content of the latter is said to be compressed into a first high-level output signal.

In the downward direction, a second output signal having a low-level of information content is synthesized from a second input signal having a high-level of information content. Thus, even without an external "lowest-level" first input signal, a second low-level output signal may be synthesized through the knowledge base of the module given a second high-level input signal, that is, the second low-level output signal is decompressed from the higher-level second input signal. For ideal operation, the second input signal is a duplication of the first output signal, and the second output signal is a duplication of the first input signal; however, more practically, the second input signal is the best prediction of the first output signal available from the knowledge base of the module and the second output signal is the prediction of the first input signal. Furthermore, the first high-level output signal of one module is applied as the first low-level input signal of the next upward module, while the second high-level input of the one module receives the second low-level output signal of this "next upward module" thereby creating a module hierarchy which provides a high degree of resolution per module as well as a large knowledge base albeit limited by the economics of the number of modules in one neural system.

Figure 2:
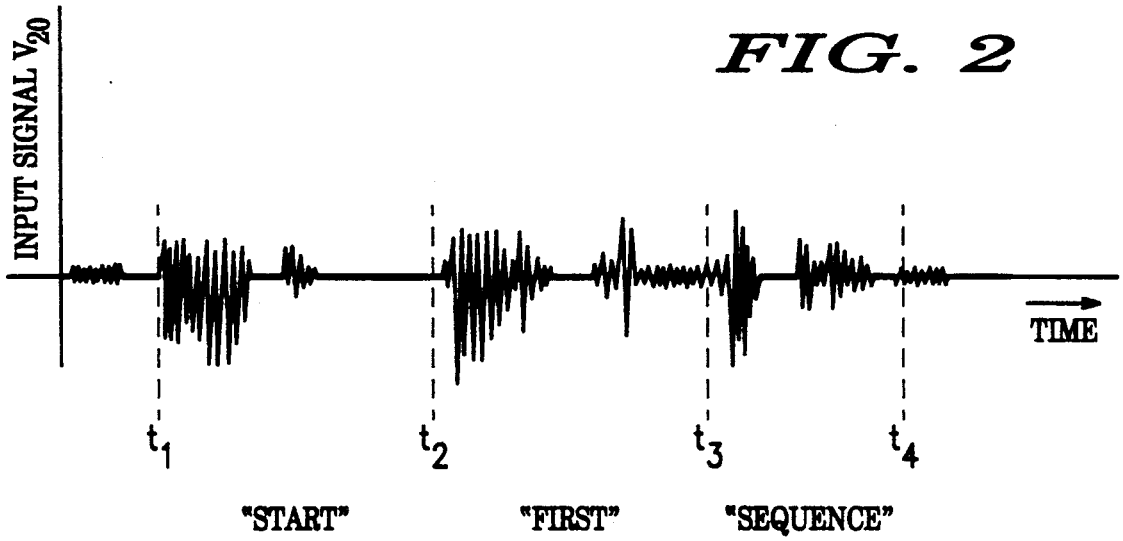
FIG. 2 is a sample waveform plot of the first input signal useful in the explanation of the preferred embodiment.

Consider for example a speech recognition and synthesis application wherein the first input signal, $V_{20}$, such as shown in FIG. 2, is applied at input 20. The first input signal may, for example, comprise the output voltage waveform of a microphone (not shown) responsive to audible speech sound waves, wherein the amplitude and frequency behavior of the output voltage thereof varies with phonic content of the speech. If the user should utter the words, "START FIRST SEQUENCE" into the microphone, the sound waves are converted to an electronic signal which is applied at input 20. For example, the amplitude and frequency variation of the first input signal occurring between times $t_1$ and $t_2$ of FIG. 2 is the word "START", while the word "FIRST" occurs between times $t_2$ and $t_3$, and the word "SEQUENCE" is between times $t_3$ and $t_4$.

SPANN 10 is organized for learning the frequency and amplitude characteristics of the first input signal and providing a first output signal as product of the recognition process of the learned information. A low-level information sequence such as the waveform plot of FIG. 2 may be learned and recognized through the module hierarchy for ultimately providing three sequential high-level output signals (one each for the three words) at the first output of module 18 representative of the information content of the low-level signal over the time period $t_1$ to $t_4$ permitting host computer to act according to the instructions contained therein. Simultaneously, the second output of each module feeds downward to the second input of each module for synthesizing a second low-level output signal from a second high-level input signal through the knowledge base thereof.

For an illustration of the recognition and synthesis process, SPANN 10 is divided into four hierarchical categories having a one-to-one correspondence with respect to modules 12-18. Within each category, the level of information content is increased over and above the previous category. For example, the amplitude and frequency variation of the first input signal may be converted through module 12 to signals symbolic of primitive sounds, although not yet discernable as a vowel or consonant. With respect to module 12, the waveform plot of FIG. 2 is considered the first low-level input signal and the signals symbolic of primitive sounds are the second output signal having a comparatively higher-level of information content. Likewise, the signals symbolic of the primitive sounds are transformed into signals representative of phonemes (now discernable as a vowel or consonant) through module 14. For module 14, the signals symbolic of primitive sounds are the first low-level input signal and the signals representative of phonemes are the first high-level output signal. Continuing the upward propagation, the signals of phonemes are transformed through module 16 to the signals of syllables, and the signals of syllables are converted through module 18 to the signals symbolic of words. Hence, the module hierarchy is built upon having the first high-level output signal of one module being applied to the first low-level input of the next module for providing sequentially higher-levels of recognition discrimination, over and above the previous module. For the preferred embodiment, module 12 is the lowest level and module 18 is the highest level.

The process of converting from one level of information, say the signals of syllables, to another level of information, say the signals of words, is learned and stored within one module, in this case module 18. Since one module is assigned the responsibility for one level of information transformation, it is understood that additional modules may be added and the aforedescribed categories may be further sub-divided whereby the recognition differential between levels is reduced and, accordingly, the resolution and ability to discriminate therebetween is increased.

Figure 3:
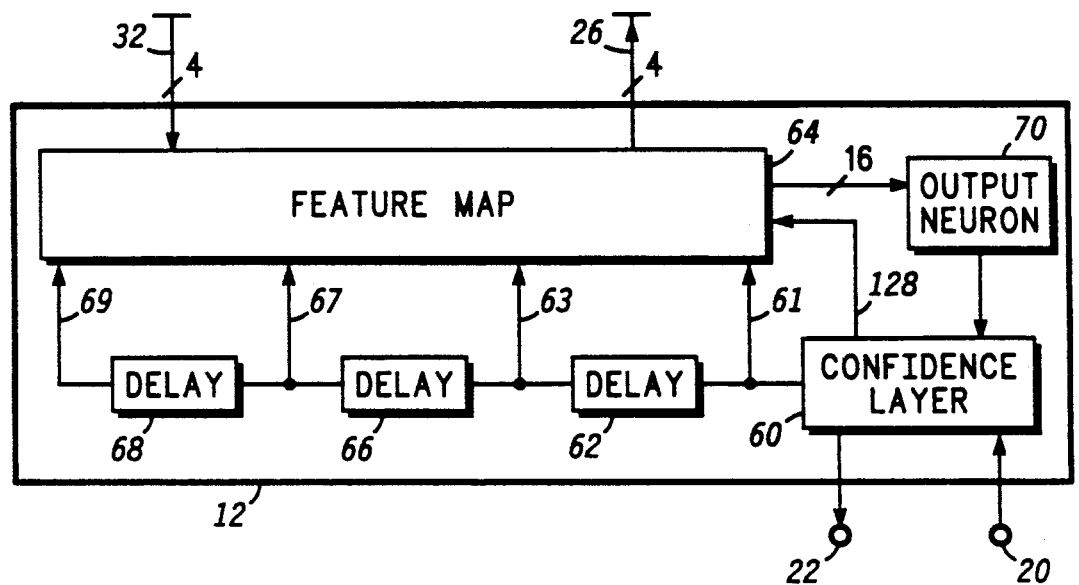
FIG. 3 is a simplified block diagram illustrating additional detail of one block of FIG. 1.

Turning to FIG. 3, module 12 is shown in greater detail. The first input of module 12, that is input 20, is coupled to the first input of confidence layer 60, while the first output of confidence layer 60 is coupled to the input of delay circuit 62 and to the first input of feature map 64 through conductor 61. Likewise, the output of delay circuit 62 is coupled to the input of delay circuit 66 and to the second input of feature map 64 via conductor 63, while the output of delay circuit 66 is coupled to the input of delay circuit 68 and to the third input of feature map 64 through conductor 67. The output of delay circuit 68 is coupled to the fourth input of feature map 64 through conductor 69. Furthermore, the second input of module 12 is coupled to the fifth input of feature map 64 via conductor 32. The first output of feature map 64 is coupled to the first output of module 12 that is conductor 26, and the second output of feature map 64 is coupled through output neuron 70 to the second input of confidence layer 60. The second output of confidence layer 60 is then coupled to output 22, and the third output of confidence layer 60 is coupled via conductor 128 to feature map 64.

Figure 4A:
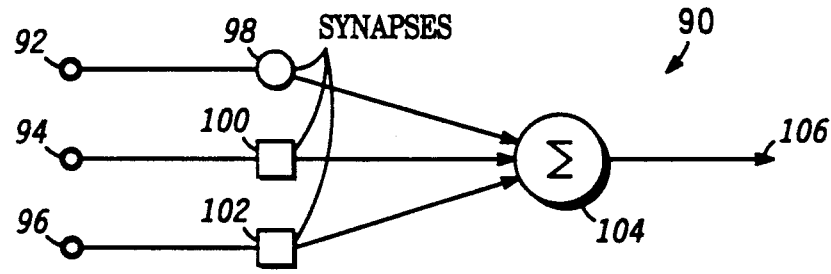
FIGS. 4A and 4B are a pair of simplified block diagrams demonstrating alternate forms of a single neuron.

Before launching into further detail of the block diagram of FIG. 3, an explanation of one fundamental building block of SPANN 10, a single neuron, may be helpful. A well known block diagram of neuron 90 is shown in FIG. 4a including inputs 92, 94 and 96 which are coupled to the inputs of synapses 98, 100 and 102, respectively, while the outputs thereof are coupled to summing junction 104. Synapses 98, 100 and 102 are weighting circuits wherein the signals applied at the inputs may be attenuated, passed without modification or even amplified depending upon the relative weighting associated therewith. Hence, the signals applied at inputs 92, 94 and 96 are weighted through synapses 98, 100 and 102 and processed through the predetermined, typically nonlinear, operation of summing junction 104. The weighted nonlinear combination of the input signals is provided through output conductor 106.

Figure 4B:
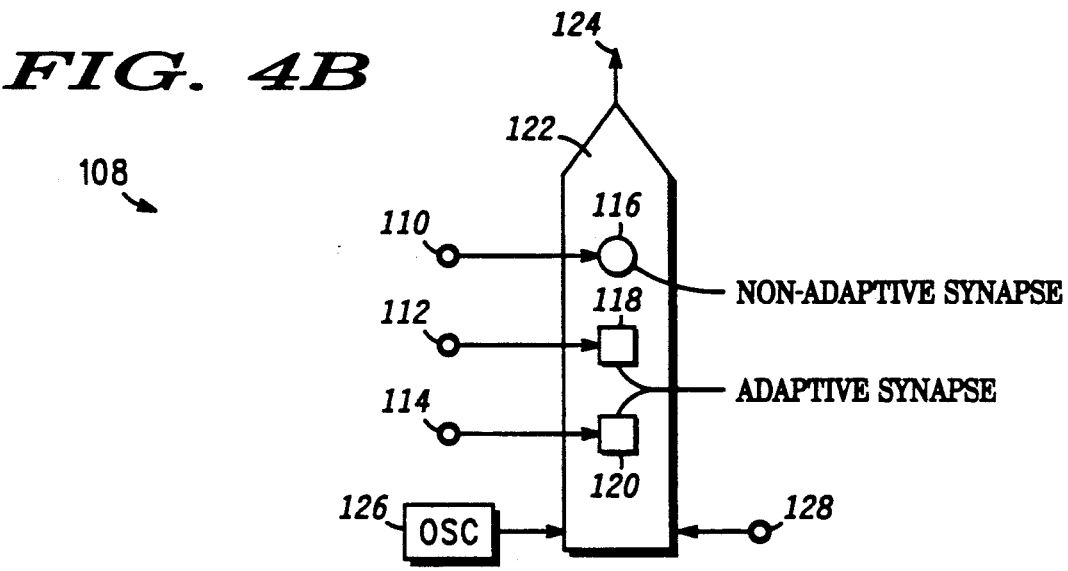

Referring to FIG. 4b, neuron 108 is shown as a functional equivalent of neuron 90 wherein the signals applied at inputs 110, 112 and 114 are weighted through synapses 116, 118 and 120, respectively, and processed through the nonlinear operation of summing junction 122 and flow through output conductor 124. Summing junction 122 may, for example, be realized with an operational amplifier having positive and negative inputs configured as a conventional summing amplifier. In addition, conductor 124 is coupled to synapses 116, 118 and 120, while oscillator 126 and conductor 128 are coupled to neuron 108, each providing an input to aid in the learning process. The signal flowing through conductor 128 is sourced from confidence layer 60 for providing an indication of the degree of novelty of the first input signal for module 12, while the output signal of oscillator 126 determines the learning rate of neuron 108, and the lateral feedback from conductor 124 enables the training for high activity outputs. Further discussion of these signals is forthcoming.

Notably, synapse 116 is labeled in FIG. 4b as a non-adaptive variety, and synapses 118 and 120 are labeled as the adaptive variety; adaptive synapses are shown as a square element, and non-adaptive synapses are shown as a circle. The distinction lies with the weighting, wherein a non-adaptive synapse has a fixed weight, i.e. it may be realized as a resistor, while the weight of an adaptive synapse is adjustable and generally has some non-volatile memory associated therewith. Consequently, the adaptive synapse is typically much more complex as well as being fundamental to the learning process. The illustration of neuron 108 in FIG. 4b shall be used hereafter as a basic building block of SPANN 10 since it tends to simplify the drawings containing many neurons.

Referring to FIG. 5a, non-adaptive synapse 116 is shown including resistor 130 coupled between input 110 and summing junction 122. Alternately, adaptive synapse 118 is shown in FIG. 5b including transistor 132 having a drain coupled to input 112 and a source coupled to one input of summing junction 122. The gate of transistor 132 is coupled through scaling circuit 134 to the first (negative) input of comparator 136, while the drain of transistor 132 is coupled to the second (positive) input of the same. The output of comparator 136 is coupled to the control input of switching circuit 138 and through inverter 139 to the control input of switching circuit 140. The conduction path of switching circuits 138 and 140 are serially coupled between power supply conductors 142 and 144, while the conduction path of switching circuit 146 is coupled between the interconnection of switching circuits 138 and 140 and the gate of transistor 148, wherein the latter includes a floating gate for maintaining non-volatile memory. The source of transistor 148 is coupled to power supply conductor 150, typically operating at ground potential, and the drain of the same is coupled to gate of transistor 132 and to source of diode-configured transistor 152. The drain and gate of transistor 152 are coupled together to power supply conductor 154, typically operating at a positive potential, $V_{DD}$. Switching circuit 156 includes first and second conduction terminals coupled between oscillator 126 and the control input of switching circuit 146, respectively. Furthermore, the first and second inputs of multiplier 158 are coupled to conductor 128 and output conductor 124 of neuron 108, respectively, while the output thereof is coupled to the control input of switching circuit 156, as shown in FIG. 5b. Synapse 120 follows the same construction and operation as synapse 118.

The signal applied at input 112 is weighted through the drain-source impedance of transistor 132 as determined by the potential developed at the gate thereof, the latter of which is also scaled through scaling circuit 134 to adjust for difference in nominal levels between the gate and drain voltages which are then applied to the first and second inputs of comparator 136, respectively. If the voltage at the drain of transistor 132 exceeds the scaled gate voltage, the output signal of comparator 136 goes high closing switching circuit 138, while the same output signal is inverted through inverter 139 causing switching circuit 140 to open. Alternately, if the voltage developed at the drain of transistor 132 falls below the scaled gate voltage, the output signal of comparator 136 goes low opening switching circuit 138 and closing switching circuit 140 again via inverter 139. The potentials applied at power supply conductors 142 and 144 are sufficient to alter the charge on the floating gate of transistor 148, typically +20 volts and −20 volts respectively. Hence, the output state of comparator 136 selects +20 volts or −20 volts to be applied through switching circuit 146 to the gate of transistor 148.

The control input of switching circuit 146 is coupled through the conduction path of switching circuit 156 to oscillator 126, the latter of which provides a pulse train operating at a predetermined frequency. The control input of switching circuit 156 is responsive to the output signal of multiplier 158, the first and second inputs of which are coupled to conductors 124 and 128. As stated, the signal flowing through conductor 128 is sourced from confidence layer 60 and provides an indication of the degree of novelty of the first input signal for module 12. For example, a high signal flowing through conductor 128 may represent the novel state wherein the input signal is new and unknown of module 12. Conversely, a low signal flowing through conductor 128 may express a confidence state wherein the first input signal is known of module 12. Novel and confidence states are further discussed in the text covering confidence layer 60. If the signals flowing in conductors 124 and 128 are high, wherein the latter indicates that the nonlinear sum of the weighted input signals of neuron 108 is high, then the control input of switching circuit 156 is activated as the product of these signals exceeds the control threshold thereof. In other words, synapse 118 is allowed to learn if (1) the output signal of neuron 108 is active indicating that it is sensitive to the amplitude and frequency characteristics of the first input signal present at the first input, and (2) confidence layer 60 conveys a novel state indicating unknown information is present in the first input signal for learning.

Given the novel state of the confidence layer and a high output signal for neuron 108, switching circuit 156 is rendered conductive causing switching circuit 146 to periodically close as determined by the frequency of the output signal of oscillator 126 thereby applying pulses of +20 volts or −20 volts to the floating gate of transistor 148 depending upon the output signal of comparator 136. The duty cycle of the pulses is such that no one single pulse has a significant impact on the conductivity of transistor 148; however, learning continues under such conditions since, over a period of time, the potential developed at the drain of transistor 148 adjusts the voltage at the gate of transistor 132 such that the signal flowing through the drain-source conduction path of the latter is weighted according to the likelihood of such a signal being present. The voltage developed at the gate of transistor 132 shifts toward equilibrium with the signal applied to the drain thereof such that the differential voltage across the first and second inputs of comparator 136 is reduced toward zero. Hence, adaptive synapse 118 has learned the frequency and amplitude characteristics of the first input signal applied at the drain of transistor 132 and stored the information as a charge on the floating gate of transistor 148 whereby a weight is established to favorably match an input signal with such characteristics. The rate of learning is determined via the frequency of the output signal of oscillator 126 which is typically 100 KHz. However, it is the combination of the synaptic weights which determines the filtering behavior of neuron 108 to various input signals applied thereto. A low signal flowing through either conductor 124 or 128 drives the output signal of multiplier 158 low opening switching circuit 156 and inhibiting the periodic closure of switching circuit 146 and, correspondingly the learning process, thereby maintaining the present value of the synaptic weight of transistor 132.

Figure 6:
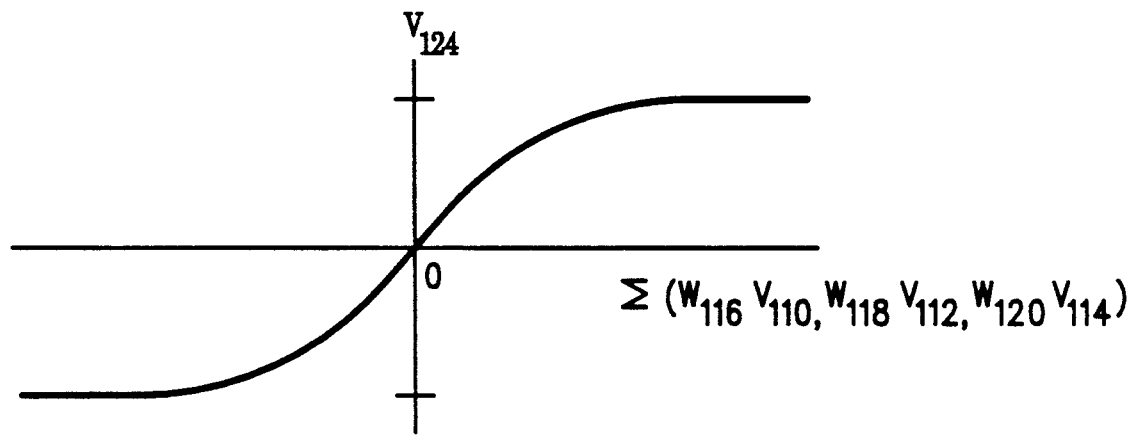
FIG. 6 is a waveform plot of a nonlinear behavior of the summing junction of a neuron.

The nonlinearity of summing junction 122 is illustrated in FIG. 6 as a sigmoid. The signals applied at inputs 110, 112 and 114 ($V_{110}$, $V_{112}$ and $V_{114}$) are weighted through synapses 116, 118 and 120 ($W_{116}$, $W_{118}$ and $W_{120}$) and applied to the inputs of summing junction 122, respectively. The sum of $W_{116}V_{110}+W_{118}V_{112}+W_{120}V_{114}$ determines the output signal flowing in conductor 124, $V_{124}$, according to FIG. 6, wherein the output signal is zero with no input signals and maximizes in the positive and negative limits of the summation as shown.

Figure 7:
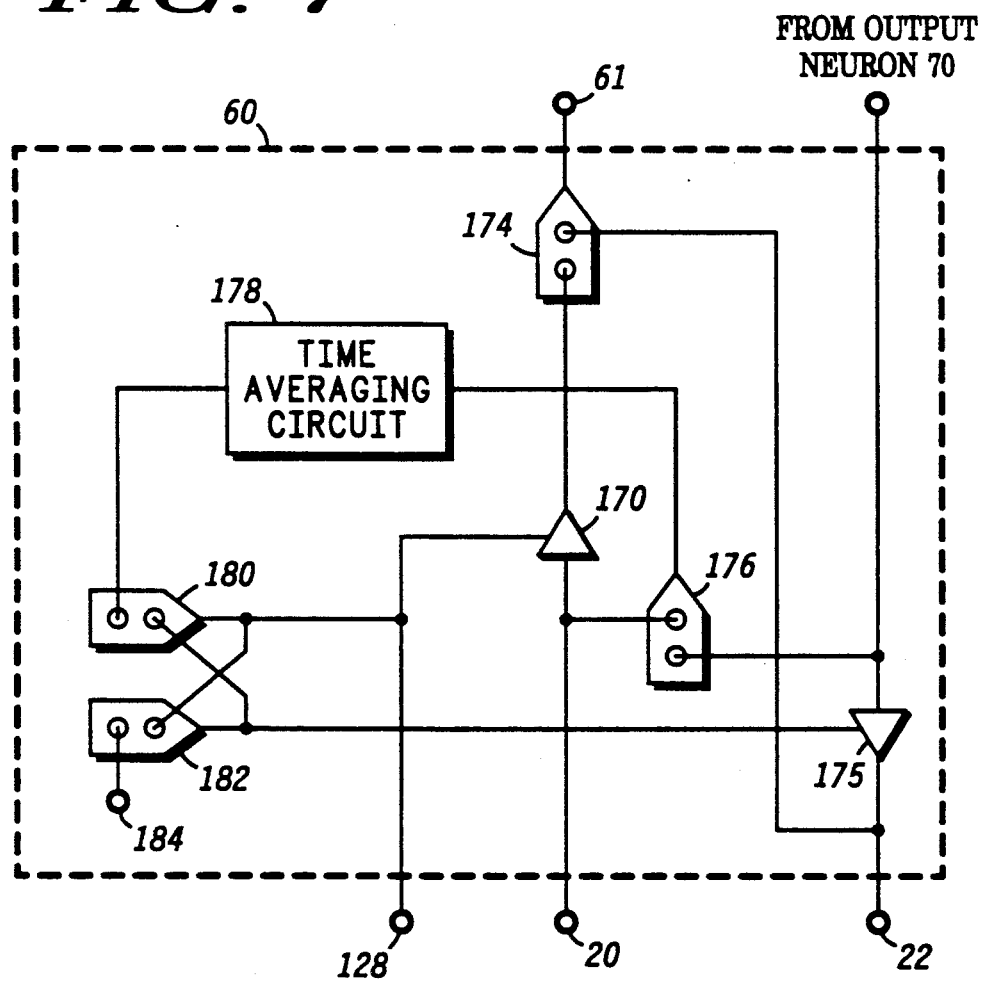
FIG. 7 is a simplified block diagram illustrating additional detail of the confidence layer block of FIG. 3.

With the typical neuron building block in place, the discussion returns to FIG. 3 and continues with confidence layer 60, which is shown in greater detail in FIG. 7. Input 20 is coupled through the first input of confidence layer 60 to the input of gain controllable amplifier 170, the output of which is coupled to the first non-adaptive synapse of neuron 174. The output of neuron 174 is coupled to conductor 61 that is the input of delay circuit 62. The output of output neuron 70 is coupled to the input of gain controllable amplifier 175, the output of which is coupled to output 22 and to the second non-adaptive synapse of neuron 174. The inputs of gain controllable amplifiers 170 and 175 are also coupled to the first and second non-adaptive synapses of neuron 176, while the output of the latter is coupled to the input of time averaging circuit 178. Typically, the first and second non-adaptive synapses of neuron 176 are equal in magnitude and opposite in sign. The absolute value of the output signal of neuron 176 is taken prior to summing and averaging within time averaging circuit 178 allowing neuron 176 to monitor positive and negative variation at the inputs thereof. A negative value synapse may be realized for example by routing the output terminal of resistor 130 to the negative input of the aforementioned operational amplifier of summing junction 122. The output of time averaging circuit 178 is coupled to the first non-adaptive synapse of neuron 180, while the output of neuron 180 is coupled to the control input of gain controllable amplifier 170 and to the first non-adaptive synapse of neuron 182. The output of neuron 182 is coupled to the control input of gain controllable amplifier 175 and to the second non-adaptive synapse of neuron 180. Typically, the second synapse of neuron 180 and the first synapse of neuron 182 are negative values. A bias voltage is applied to the second non-adaptive synapse of neuron 182 at input 184. The output of neuron 180 is also coupled through conductor 128 to adaptive synapses of feature map 64, as described for neuron 108. Neuron 176 operates as a comparing circuit by monitoring the first input signal applied at input 20 and the signal provided from output neuron 70 which, as will be shown, is the prediction of the first input signal, while the output signal of neuron 176 is the degree of correlation of the first input signal and the synthesized second output signal, that is the output signal of output neuron 70.

Recall that one objective of the present invention is to recognize the first input signal over a period of time and provide an output signal symbolic of the information content thereof. Consider an example wherein the beginning sequence of a command, say the word "START" in the command string of FIG. 2 is not immediately recognized and the synthesized output signal of output neuron 70 is thus uncorrelated with respect to the first input signal. Since the input signals of gain controllable amplifiers 170 and 175 do not track one another, the output signal of neuron 176 tends to develop non-zero value, possibly high frequency, depending upon the frequency of the first input signal. Time averaging circuit 178 is provided for maintaining a running time average at the output thereof which is applied to the first synapse of neuron 180. Over a period of time, the output signal of time averaging circuit 178 increases to a high level because of the low degree of correlation between the first input signal and the synthesized output signal of output neuron 70.

The combination of neuron 180 and 182 behaves as a flipflop circuit with hysteresis. If the first and second synapses of neurons 180 and 182 are assigned equal magnitude weights, then the output signal of neuron 180 switches high when the output signal of time averaging circuit 178 exceeds a predetermined value, i.e. $V_{max}$ of FIG. 8, in excess of the bias voltage applied at input 184 to the second synapse of neuron 182. The high output signal of neuron 180 holds the output signal of neuron 182 low through its second negative synapse. In addition, the output signal of neuron 182 is sufficiently low as to not overcome the high signal applied at the first synapse of neuron 180.

The high output signal of neuron 180 enables gain controllable amplifier 170, while the low output signal of neuron 182 disables gain controllable amplifier 175. This defines the novel state of confidence layer 60, wherein the first input signal flows through gain controllable amplifier 170 and neuron 174 as well as delay circuits 62, 66 and 68 into feature map 64 where it may be recognized, and learned as necessary; see the aforedescribed operation of synapse 118.

Once the amplitude and frequency behavior of the first input signal is recognized within feature map 64, the output signal of output neuron 70 begins to track the first input signal thereby developing a higher degree of correlation between these two signals causing the output signal of neuron 176 to reduce toward zero indicating that module 12 is providing a high degree of predictability of the first input signal. Again, over a period of time, the output signal of time averaging circuit 178 decreases toward zero and, as it drops to a predetermined level ($V_{min}$ of FIG. 8), the output signal of neuron 180 switches to a low state allowing the output signal of neuron 182 to switch to a high state whereby gain controllable amplifier 170 is disabled and gain controllable amplifier 175 is enabled. The output signal of output neuron 70 may then pass through output 22 to an output device such as a speaker (not shown). Since the output signal of output neuron 70 is providing a high degree of predictability of the first input signal, the output signal of gain controllable amplifier 175 is applied to the second non-adaptive input of neuron 174 to continue feeding feature map 64 with the prediction of the first input signal, while the conduction path through gain controllable amplifier 170 is disabled. The signal flowing in output 22, at least while confidence layer 60 is registering the confidence state, maintains a high degree of correlation with respect to the first input signal. Hence, the second output signal of module 12 is a synthesized replica of the first input signal.

As long as the output signal of output neuron 70 tracks the first input signal, feature map 64 may continue to predict the next state of the first input signal. This feature is key for providing the ability to recognize a known pattern of the first input signal even though in operation the first input signal may be corrupted in the presence of noise. Once in the confidence state, the first input signal pattern symbolic of the letter "S" of the word "START" for example, may be recognized in spite of the noisy input signal. Time averaging circuit 178 filters the instantaneous variation in the output signal of neuron 176 allowing feature map 64 to continue predicting as long as possible. However, if the output signal of output neuron 70 continues to deviate from the first input signal over a period of time, the novel state is again declared by neuron 176.

The time constant of time averaging circuit 178 limits the rate of change of confidence layer 60 between the novel and confidence states and, consequently, it is established in accordance with the maximum estimated frequency component of the first input signal. For example, the time constant of time averaging circuit 178 may be 100 microseconds for a maximum frequency of 20 KHz for the acoustic input signal applied at input 20. The waveform plot of the output signal of time averaging circuit 178, $V_{178}$, and the output signal of neuron 180, $V_{180}$, are illustrated in FIG. 8. At time $t_0$, the output signal of output neuron 70 is tracking the first input signal and confidence layer 60 is registering a confidence state. At time $t_1$, the first input signal changes behavior possibly in connection with the beginning of the next word, say "FIRST", in the command string of FIG. 2. Shortly thereafter, as signal $V_{178}$ crosses the $V_{max}$ threshold, signal $V_{180}$ switches to the novel state since feature map 64 has not yet recognized the new amplitude and frequency characteristics of the first input signal. Although signal $V_{178}$ dips below the $V_{max}$ threshold at time $t_2$, the output signal does not change state because of the hysteresis of neurons 180 and 182 until time $t_3$ at which time the output signal of output neuron 70 is on track with the first input signal, that is, the first input signal is recognized via feature map 64, driving the output signal of neuron 176 low and reducing signal $V_{178}$ whereby confidence layer 60 returns to the confidence state.

Continuing with FIG. 3, the signal provided at the first output of confidence layer 60 is systematically delayed through delay circuits 62, 66 and 68 for providing a spatial vector of the first input signal wherein each element thereof is equal to the value of the first input signal at progressive later instances in time. For example, assuming constant and equal delays, say "$t_d$" seconds, the output signals of delay circuits 62, 66 and 68 are $V_{60}(t_0-t_d)$, $V_{60}(t_0-2t_d)$ and $V_{60}(t_0-3t_d)$, respectively, where $V_{60}(t_0)$ is the non-delayed time value. Hence, the spatial vector comprising elements $V_{60}(t_0)$, $V_{60}(t_0-t_d)$, $V_{60}(t_0-2t_d)$ and $V_{60}(t_0-3t_d)$ is applied through conductors 61, 63, 67 and 69 to the first, second, third and fourth inputs of feature map 64, respectively. The length of the spatial vector is typically made much longer in practice, say 20 or more elements, with additional delay circuits thereby increasing the sample space of the first input signal. Typically, the time delay $t_d$ is 10 microseconds for processing voice data at a maximum frequency of 20 KHz.

Figure 9:
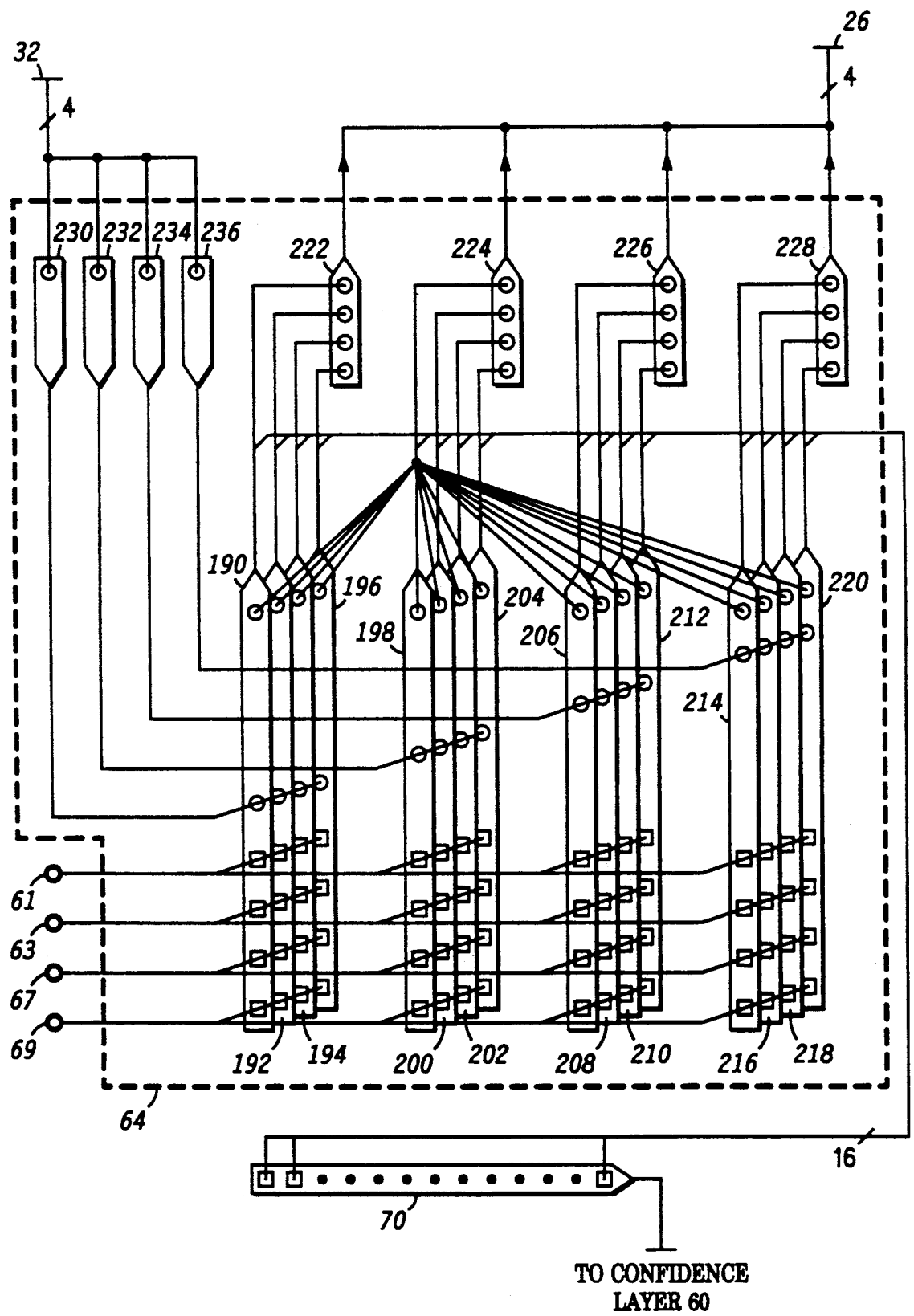
FIG. 9 is a simplified block diagram illustrating additional detail of the feature map block of FIG. 3.

Turning to FIG. 9, feature map 64 and output neuron 70 are shown in greater detail including a field of neurons 190, 192, 194, 196, 198, 200, 202, 204, 206, 208, 210, 212, 214, 216, 218 and 220 each having a first adaptive synapse coupled to conductor 61 for receiving signal $V_{60}(t_0)$. Likewise, conductor 63 is coupled to the second adaptive synapses of neurons 190-220, conductor 67 is coupled to the third adaptive synapses of neurons 190-220 and conductor 69 is coupled to the fourth adaptive synapses of the same. The outputs of neurons 190, 192, 194 and 196 are coupled to the first, second, third and fourth non-adaptive synapses of zone sensor neuron 222, and the outputs of neurons 198, 200, 202 and 204 are coupled to the first, second, third and fourth non-adaptive synapses of zone sensor neuron 224, respectively. In addition, the outputs of neurons 206, 208, 210 and 212 are coupled to the first, second, third and fourth non-adaptive synapses of zone sensor neuron 226, and the outputs of neurons 214, 216, 218 and 220 are coupled to the first, second, third and fourth non-adaptive synapses of zone sensor neuron 228, respectively. The non-adaptive synapses of zone sensor neurons 222-228 are typically equal in weight. Conductors 26 and 32 each comprise four separate channels whereby the outputs of zone sensor neurons 222-228 are coupled to the four channels of conductor 26. It is understood that the recognition of the aforedescribed output signal symbolic of the information content of the spatial vector is provided at the outputs of neurons 190-220 and the use of zone sensor neurons 222-228 is optional; however, practically speaking, zone sensor neurons 222-228 are desirable since they combine the numerous output signals of neurons 190-220 thereby simplifying the interface between modules.

The sixteen outputs of neurons 190-220 are also respectively coupled to sixteen adaptive synapses of output neuron 70 as shown, wherein each of the weights thereof are equal to the respective adaptive synapses of neurons 190-220 corresponding to conductor 61. The magnitude of the output signal of output neuron 70 is proportional to the weighted sum of the output signals of neurons 190-220, hence, the former is the prediction of the signal flowing through conductor 61. Those output signals of neurons 190-220 having the greatest magnitude determine the prediction at the output of neuron 70 along with the adaptive weights driven by the most active set of neurons. Since the adaptive synapses of output neuron 70 match the adaptive synapses of neurons 190-220 which are coupled to non-delayed conductor 61, the output signal of output neuron 70 is the prediction of the first input signal as determined from the knowledge base of feature map 64. The output of output neuron 70 is then coupled to the second input of confidence layer 60.

The four channels of conductor 32 are coupled to the non-adaptive synapses of zone effector neurons 230, 232, 234 and 236, the outputs of which are coupled to non-adaptive synapses of neurons 190-196, 198-204, 206-212 and 214-220, respectively. The non-adaptive synapses of zone effector neurons 230-236 are also typically equal in weight.

Furthermore, the outputs of neurons 190-220 are coupled to one non-adaptive synapse of each neuron, one of which is shown for example in FIG. 9, wherein the output of neuron 198 is coupled to one non-adaptive synapse of each of neurons 190-220. Likewise, the output of neuron 200 is coupled to non-adaptive synapses of neurons 190-220 (not shown), and so on. Hence, each neuron comprises a number of adaptive synapses equal to the number of elements in the spatial vector, four in the present example; and a number of non-adaptive synapses equal to the total number of neurons in the field plus one for the associated zone effector neuron, totaling seventeen in the present example. The weighting assigned to the non-adaptive synapses of each neuron in the field coupled to the output of the other neurons in the field follow the graph shown in FIG. 10 which illustrates the associative weighting of the adaptive synapses within a particular neuron. The construction and operation of neurons 190-236 follow that of neuron 108.

One neuron, say neuron 198 for example, is assigned the task of identifying a particular characteristic of the first input signal, say a change in amplitude from a first level to a second level within a given period of time. Neuron 198 is typically grouped with other neurons, say neurons 200-204, which identify other closely related characteristics of the first input signal, and as such are considered to be in the close proximity of, or equivalently, in the logical neighborhood of neuron 198. Conversely, other neurons, say neurons 190–196, may identify characteristics of the first input signal much different than that of neurons 198–204. Hence, according to FIG. 10, the weights of the non-adaptive synapses of neuron 198 coupled to the outputs of neurons 198–204 are set to a high value, i.e., a low impedance for resistor 130 of synapse 116, while the non-adaptive synapses of neuron 198 coupled to the outputs of neurons farther away in a logical sense, such as neurons 190–196, are set to a lower value again according to FIG. 10. Ultimately, the non-adaptive synapses of neuron 198 coupled to the outputs of neurons farthest away, say neurons 214–220, are assigned small, possibly negative values.

To better understand the filtering action of neuron 198 that provides the aforedescribed recognition property, consider a simple training example wherein no apriori knowledge is stored in feature map 64. The adaptive synaptic weights of neurons 190–220 are randomized as is a common initialization step known in the art of neuron networks. The first input signal applied at input 20 alternates between values of +1 and −1 every "$t_d$" seconds. Since no apriori knowledge is provided, confidence layer 60 switches to the novel state allowing feature map 64 to learn the pattern. Delay circuits 62, 66 and 68 are conveniently selected with delays of "$t_d$" seconds so as to generate a spatial vector [1, −1, 1, −1]. Assume that the adaptive synapses of neuron 198 by chance have been initially randomized closest to the first input signal pattern [1, −1, 1, −1] thereby providing the highest activity at the output thereof encouraging neuron 198 to further learn the pattern, see discussion of adaptive synapse training. After numerous passes of the first input signal, the weights of the adaptive synapses of neuron 198 migrate toward the values [1, −1, 1, −1] thereby matching the characteristics of the first input signal over the given period. The first input signal has thus been learned and neuron 198 now possess the ability to recognize such a pattern. Further assume that a another neuron, say neuron 200, has learned the first input signal pattern [1, 1, 1, −1].

The first input signal sequence [1, −1, 1, −1] is now applied to input 20 and, consequently, to the adaptive synapses of neurons 190–220. The output signal of neuron 200, $V_{200}$, is equal to:

$$V_{200} = \sigma(W_{200.1}V_{61} + W_{200.2}V_{63} + W_{200.3}V_{67} + W_{200.4}V_{69}) \\
= \sigma((1)(1) + (1)(-1) + (1)(1) + (-1)(-1)) \\
= \sigma(2) \quad (1)$$

where:

$\sigma(\ )$ is nonlinear transfer function (sigmoid) of neuron 200

$W_{200.1}$ is the value of the first adaptive synapse of neuron 200

$W_{200.2}$ is the value of the second adaptive synapse of neuron 200

$W_{200.3}$ is the value of the third adaptive synapse of neuron 200

$W_{200.4}$ is the value of the fourth adaptive synapse of neuron 200

$V_{61}$ is the value of the signal flowing through conductor 61

$V_{63}$ is the value of the signal flowing through conductor 63

$V_{67}$ is the value of the signal flowing through conductor 67

$V_{69}$ is the value of the signal flowing through conductor 69

The output signal of neuron 198, $V_{198}$, is equal to:

$$V_{198} = \sigma(W_{198.1}V_{61} + W_{198.2}V_{63} + W_{198.3}V_{67} + W_{198.4}V_{69}) \\
= \sigma((1)(1) + (-1)(-1) + (1)(1) + (-1)(-1)) \\
= \sigma(4) \quad (2)$$

where:

$W_{198.1}$ is the value of the first adaptive synapse of neuron 198

$W_{198.2}$ is the value of the second adaptive synapse of neuron 198

$W_{198.3}$ is the value of the third adaptive synapse of neuron 198

$W_{198.4}$ is the value of the fourth adaptive synapse of neuron 198

Comparing equations (1) and (2), the value of $\sigma(4)$ read from the sigmoid of FIG. 6 is greater than the value of $\sigma(2)$, hence, neuron 198 wins the competition and the aforedescribed characteristic of the first input signal is identified. In general, the neuron or group of neurons having the largest magnitude of output signal is considered the winner of the competition over the input spatial vector whereby the sample space of the first input signal is compressed into the first output signal having a higher-level of information content than that of the first input signal. By sampling the low-level input signal over a period of time and providing a simultaneous vector representation thereof, the output signal of the winning neuron(s), neuron 198 in the present example, contains the same relevant information as contained in the sample space of the first input signal.

The transformation is possible, in part, through the spatial vector formed over multiple time samples of the first input signal whereby the neurons of feature map 64 can monitor the first input signal over a predetermined temporal sample space thereby providing the first output signal in real-time response thereto representative of the best prediction based upon the knowledge stored in the adaptive synapses of the individual neurons. It is understood that feature map 64 in practice may comprise many more neurons with many more adaptive and non-adaptive synapses than illustrated in FIG. 9, and the spatial vector is typically much longer than the preceding example; however, a more involved system follows the same fundamental connection and operation, as described herein. The contribution of the zone effector neurons 230–236 and the output signals of neurons 190–196 and 200–220 applied to the non-adaptive synapses of neuron 198 have been momentarily neglected to simplify the example. In practice, zone effector neurons 230–236 bias neurons 190–220 through the respective non-adaptive synapse through the second high-level input signal from module 14, while the non-adaptive synapses are coupled to the respective outputs of neurons 190–220, wherein the weights of the latter are established in accordance with FIG. 10 for providing feedback signals which tend to favor the neuron winning the competition thereby creating a bubble of activity centered the winning neurons. The learning process for feature map 64 is simply a matter of applying the spatial vector of an input signal and allowing the synapses of the feature map to develop sensitivities to the input signal in the manner described for neuron 108. The architecture is thus self-organizing.

By now it should be appreciated that one important feature of delay circuits 62-68 is to provide a sample space of the first input signal over multiple units of time. Through the spatial vector, the neurons of feature map 64 compress the information provided in the first input signal into the first output signal containing the same relevant information only at a lower operating frequency. The average period of pattern stability of the sample space is compressed into a typically unique, continuous output pattern having a longer average period of pattern stability, that is, the first output signal is said to have a high-level of information content. Hence, the first output signal of module 12 flowing through conductor 26 to the first input of module 14 may be symbolic of primitive sounds generated from the first input signal over the sample space of the spatial vector, and since the spatial vector is continuously updated with new information from the first input signal, the output signal of module 12 is the first input signal for module 14, albeit operating with a lower frequency than the first input signal applied at input 20.

Figure 11:
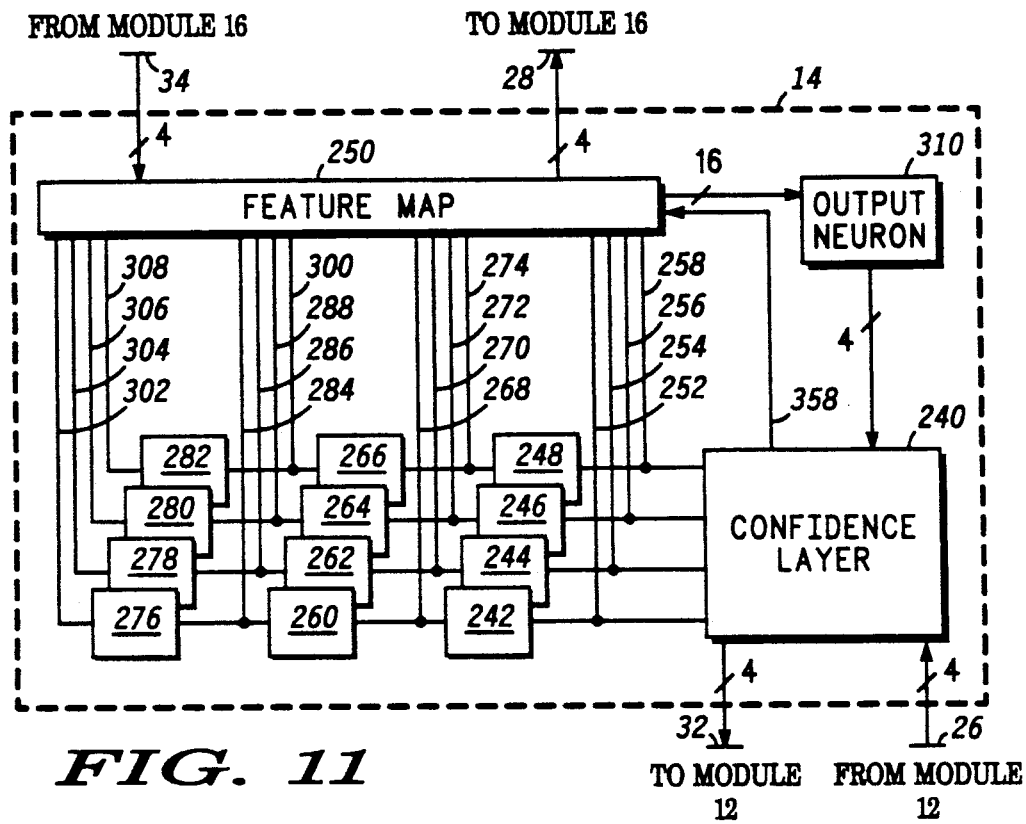
FIG. 11 is a simplified block diagram illustrating additional detail of another block of FIG. 1.

Turning to FIG. 11, module 14 is shown in greater detail having a similar construction as the aforedescribed module 12, but including some notable distinctions. The first output of module 12 is coupled through conductor 26 which includes four channels from feature map 64 to the first input of module 14, the latter of which is also coupled to the first input of confidence layer 240. Since, confidence layer 240 is processing four individual channels, the first output thereof also provides four channels which are coupled to the inputs of delay circuits 242, 244, 246 and 248 and to feature map 250 via conductors 252, 254, 256 and 258, respectively. Likewise, the outputs of delay circuits 242, 244, 246 and 248 are coupled to the inputs of delay circuits 260, 262, 264 and 266 and through conductors 268, 270, 272 and 274 to feature map 250, while the outputs thereof are coupled to the inputs of delay circuits 276, 278, 280 and 282 and to feature map 250 via conductors 284, 286, 288 and 300, respectively. The outputs of delay circuits 276, 278, 280 and 282 are coupled through conductors 302, 304, 306 and 308 to feature map 250. The first output of feature map 250 is coupled through conductor 28 to the first input of module 16, and the second output of feature map 250 is coupled through output neuron 310 to the second input of confidence layer 240. The second output of confidence layer 240 is coupled through conductor 32 to feature map 64 of module 12. Similarly, the second output of module 16 is coupled through the second input of module 14 to feature map 250, and the third output of confidence layer 240 is coupled via conductor 358 to feature map 250.

Figure 12:
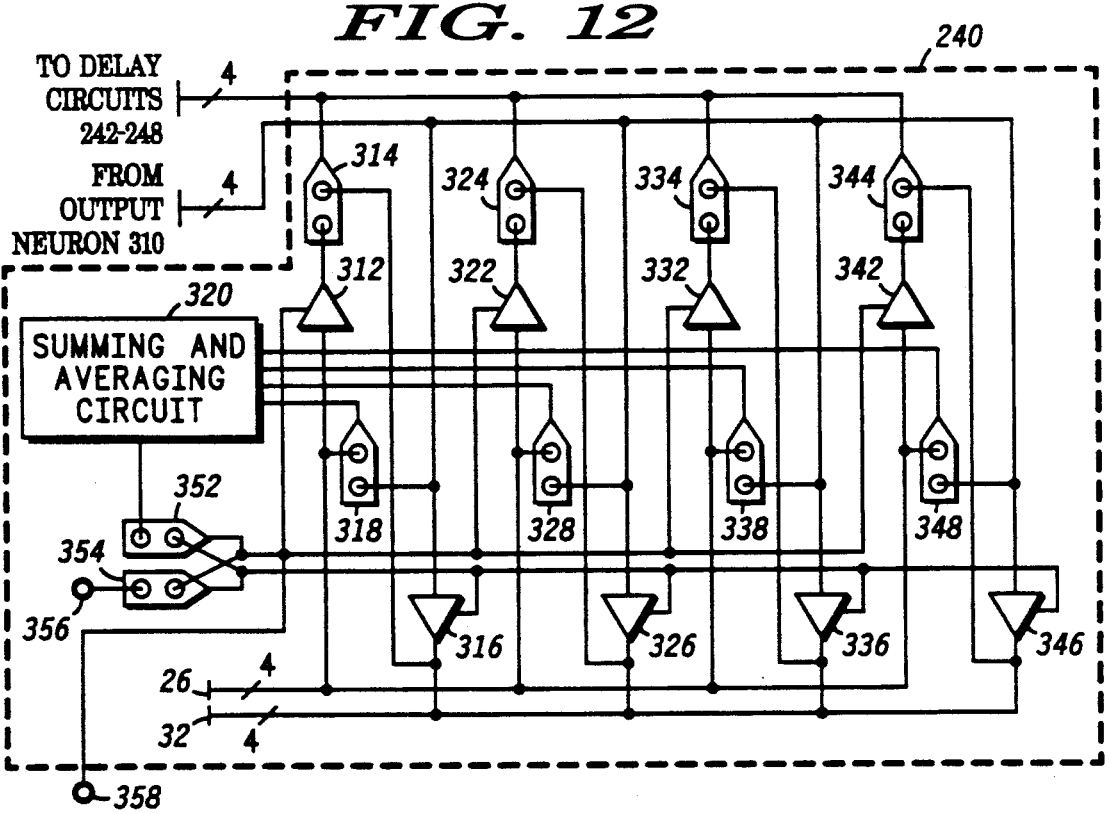
FIG. 12 is a simplified block diagram showing additional detail of the confidence layer block of FIG. 11.

The block diagram of confidence layer 240 is illustrated in FIG. 12 having four similar channels, one of which is illustrated in FIG. 7 and thoroughly described the associated text. The first channel of conductor 26 is coupled to the input of gain controllable amplifier 312, the output of which is coupled to the first non-adaptive synapse of neuron 314. The output of neuron 314 is coupled to the input of delay circuit 242 that is conductor 252, and the first output of output neuron 310 is coupled to the input of gain controllable amplifier 316, the output of which is coupled to the first channel of conductor 32 and to the second non-adaptive synapse of neuron 314. The inputs of gain controllable amplifiers 312 and 316 are coupled to the first and second non-adaptive synapses of neuron 318, respectively, while the output of the latter is coupled to the first input of time averaging circuit 320. The second channel of conductor 26 is coupled to the input of gain controllable amplifier 322, the output of which is coupled to the first non-adaptive synapse of neuron 324. The output of neuron 324 is coupled to the input of delay circuit 244 that is conductor 254, and the second output of output neuron 310 is coupled to the input of gain controllable amplifier 326, the output of which is coupled to the second channel of conductor 32 and to the second non-adaptive synapse of neuron 324. The inputs of gain controllable amplifiers 322 and 326 are coupled to the first and second non-adaptive synapses of neuron 328, respectively, while the output of the latter is coupled to the second input of time averaging circuit 320. The third channel of conductor 26 is coupled to the input of gain controllable amplifier 332, the output of which is coupled to the first non-adaptive synapse of neuron 334. The output of neuron 334 is coupled to the input of delay circuit 246 that is conductor 256, and the second output of output neuron 310 is coupled to the input of gain controllable amplifier 336, the output of which is coupled to the third channel of conductor 32 and to the second non-adaptive synapse of neuron 334. The inputs of gain controllable amplifiers 332 and 336 are coupled to the first and second non-adaptive synapses of neuron 338, respectively, while the output of the latter is coupled to the third input of time averaging circuit 320. The fourth channel of conductor 26 is coupled to the input of gain controllable amplifier 342, the output of which is coupled to the first non-adaptive synapse of neuron 344. The output of neuron 344 is coupled to the input of delay circuit 248 that is conductor 258, and the second output of output neuron 310 is coupled to the input of gain controllable amplifier 346, the output of which is coupled to the fourth channel of conductor 32 and to the second non-adaptive synapse of neuron 344. The inputs of gain controllable amplifiers 342 and 346 are coupled to the first and second non-adaptive synapses of neuron 348, respectively, while the output of the latter is coupled to the fourth input of time averaging circuit 320.

The first and second non-adaptive synapses of neurons 318, 328, 338 and 348 are typically equal in magnitude and opposite in sign. The absolute value of the output signals of neurons 318, 328, 338 and 348 are taken prior to summing and averaging within time averaging circuit 320. The output of time averaging circuit 320 is coupled to the first non-adaptive synapse of neuron 352, while the output of neuron 352 is coupled to the first non-adaptive synapse of neuron 354 and to the control inputs of gain controllable amplifiers 312, 322, 332 and 342. The output of neuron 354 is coupled to the second non-adaptive synapse of neuron 352 and to the control inputs of gain controllable amplifiers 316, 326, 336 and 346. Typically, the second synapse of neuron 352 and the first synapse of neuron 354 are negative values. A bias voltage is applied to the second non-adaptive synapse of neuron 354 at input 356. The output of neuron 352 is also coupled through conductor 358 to adaptive synapses of feature map 250, as described for neuron 108.

The operation of confidence layer 240 follows that of confidence layer 64 wherein neurons 318, 328, 338 and 348 independently monitor the respective correlations between the first input signals and the output signals of output neuron 310 whereby the degree of predictability of feature map 250 may be time averaged and quantized into a confidence state and a novel state reflected through the outputs of neurons 352 and 354 for controlling the flow of information through module 14 as well as enabling and disabling the learning process of feature map 250 via conductor 358.

In the novel state, as the output signal of time averaging circuit 320 increases to high level, the output signals of neurons 352 and 354 switch to high and low levels, respectively, whereby gain controllable amplifiers 312, 322, 332 and 342 are enabled and gain controllable amplifiers 316, 326, 336 and 346 are disabled. The first input signals flow through neurons 314, 324, 334 and 344 and delay circuits 242-282 into feature map 250 for recognition, and learning as necessary. When the amplitude and frequency pattern of the first input signals are recognized, confidence layer 240 switches to confidence state and the output signals of neurons 352 and 354 switch to low and high levels, respectively, whereby gain controllable amplifiers 312, 322, 332 and 342 are disabled and gain controllable amplifiers 316, 326, 336 and 346 are enabled. The output signals of output neuron 310 may then pass through conductor 32 to zone effector neurons 230-236 of module 12.

The signal provided at the first output of confidence layer 240 is systematically delayed through delay circuits 242, 260 and 276 for providing spatial vector $[V_{240.1}(t_0), V_{240.1}(t_0-t_d), V_{240.1}(t_0-2t_d)$ and $V_{240.1}(t_0-3t_d)]$, where $V_{240.1}(t_0)$ is the non-delayed time value of the signal flowing through conductor 252. Likewise, the second output signal of confidence layer 240 is delayed through delay circuits 244, 262 and 278 for providing spatial vector $[V_{240.2}(t_0), V_{240.2}(t_0-t_d), V_{240.2}(t_0-2t_d)$ and $V_{240.2}(t_0-3t_d)]$, where $V_{240.2}(t_0)$ is the non-delayed time value of the signal flowing through conductor 254. The third output signal of confidence layer 240 is delayed through delay circuits 246, 264 and 280 for providing spatial vector $[V_{240.3}(t_0), V_{240.3}(t_0-t_d), V_{240.3}(t_0-2t_d)$ and $V_{240.3}(t_0-3t_d)]$, where $V_{240.3}(t_0)$ is the non-delayed time value of the signal flowing through conductor 256, and the fourth output of confidence layer 240 is delayed through delay circuits 248, 266 and 282 for providing spatial vector $[V_{240.4}(t_0), V_{240.4}(t_0-t_d), V_{240.4}(t_0-2t_d)$ and $V_{240.4}(t_0-3t_d)]$, where $V_{240.4}(t_0)$ is the non-delayed time value of the signal flowing through conductor 258. Since the maximum frequency of the first input signal of module 14 is lower than the maximum frequency of the first input signal of module 12, the delay through delay circuits 242-282 are made longer than those of delay circuits 62-69, typically by a factor of four. The increase in delay times between modules 12 and 14 allows the latter to systematically increase the information content of the output signal per module. The average period of pattern stability of the sample space is compressed into a typically unique and continuous output pattern having a longer average period of pattern stability, that is, the output signal is said to have a higher-level of information content. The transformation increases the pattern stability without losing the relevant information content.

Figure 13:
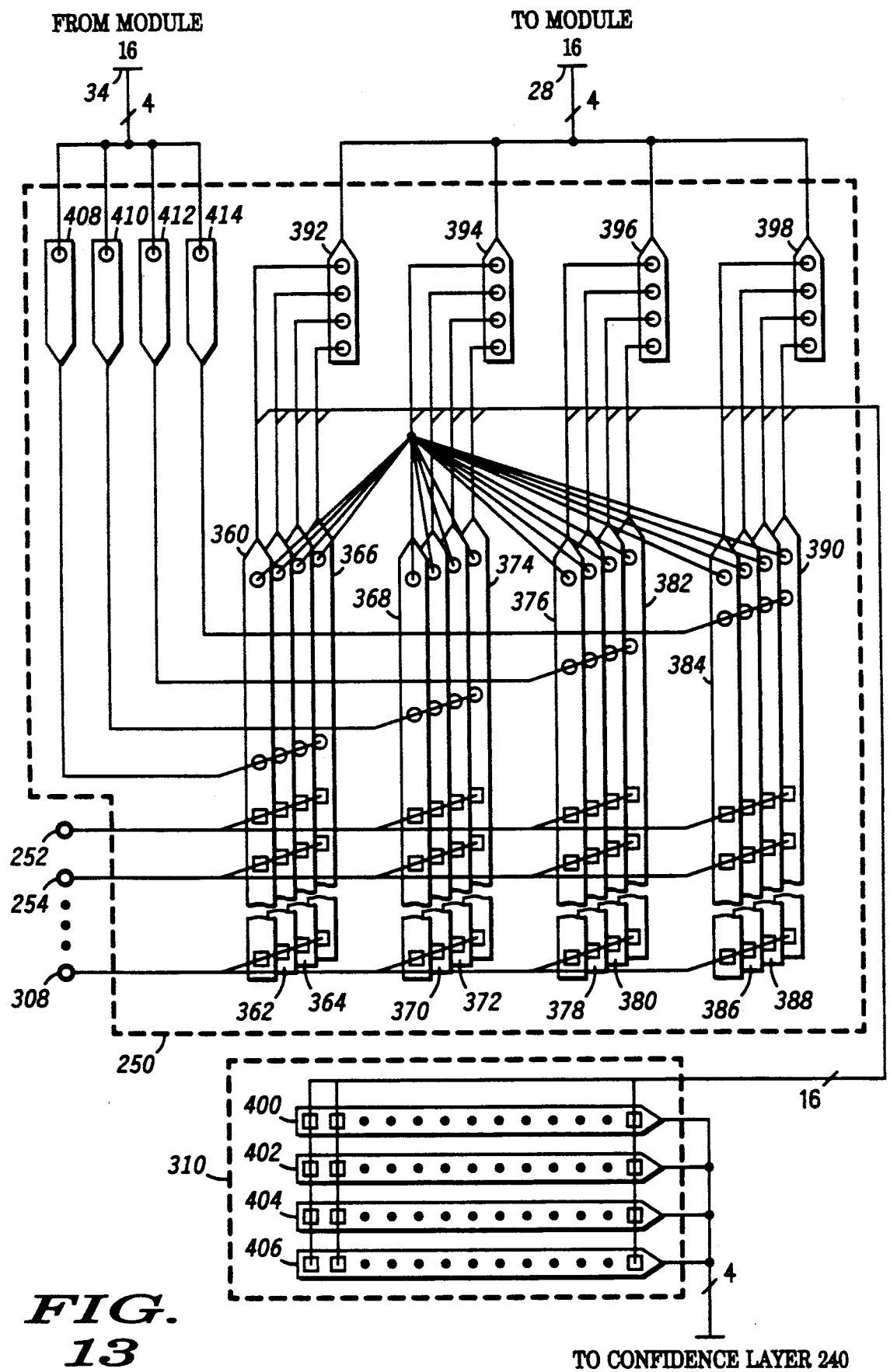
FIG. 13 is a simplified block diagram illustrating additional detail of the feature map block of FIG. 11.

Referring to FIG. 13, feature map 250 and output neuron 310 are shown in greater detail and follow the same construction and operation as described for feature map 64 and output neuron 70. More specifically, feature map 250 comprises a field of neurons 360, 362, 364, 366, 368, 370, 372, 374, 376, 378, 380, 382, 384, 386, 388 and 390 each having a first adaptive synapse coupled to conductor 252 for receiving signal $V_{240.1}(t_0)$.

Likewise, conductor 254 is coupled to the second adaptive synapses of neurons 360-390, conductor 256 is coupled to the third adaptive synapses of neurons 360-390, and so on through conductor 308 wherein the latter is coupled to the sixteenth adaptive synapse of neuron 360-390 thereby completing sixteen connections per neuron. The outputs of neurons 360, 362, 364 and 366 are coupled to the first, second, third and fourth non-adaptive synapses of zone sensor neuron 392, and the outputs of neurons 368, 370, 372 and 374 are coupled to the first, second, third and fourth non-adaptive synapses of zone sensor neuron 394, respectively. In addition, the outputs of neurons 376, 378, 380 and 382 are coupled to the first, second, third and fourth non-adaptive synapses of zone sensor neuron 396, and the outputs of neurons 384, 386, 388 and 390 are coupled to the first, second, third and fourth non-adaptive synapses of zone sensor neuron 398, respectively. The outputs of zone sensor neurons 392-398 are coupled to conductor 28. Conductors 28 and 34 each comprise four separate channels. The sixteen outputs of neurons 360-390 are also respectively coupled to the sixteen adaptive synapses of output neurons 400, 402, 404 and 406 as shown, wherein each of the weights of the latter are equal to the respective adaptive synapses of neurons 360-390 corresponding to conductor 252. The outputs of output neurons 400-406 are coupled to the inputs of gain controllable amplifiers 316, 326, 336 and 346, respectively. The four channels of conductor 34 are coupled to the non-adaptive synapses of zone effector neurons 408, 410, 412 and 414, the outputs of which are coupled to non-adaptive synapses of neurons 360-366, 368-374, 376-382 and 384-390, respectively.

The spatial vector provided at the tap points of delay circuits 242-282 allows the neurons of feature map 250 to compress the information provided through first input signal of module 14 into the second output signal thereof containing the same relevant information only at a lower operating frequency. The amplitude and frequency variations of the first input signal over a period of time, i.e. the sample space, are transformed into a unique and continuous output signal containing the same relevant information with a longer period of pattern stability as compared to the temporal sample space or, equivalently, the first output signal contains a higher-level of information content. Thus, the first output signal of module 14 flowing through conductor 28 to the first input of module 16 may be symbolic of phonemes transformed from the first input signal over the sample space of the spatial vector symbolic of the primitive sounds. Since the spatial vector is continuously updated with new information from the first input signal, the first output signal of module 14 is the first input signal of module 16 operating at a still lower frequency than that of the first input signal of module 14.

Returning to FIG. 1, module 16 follows the same construction and operation as module 14 feeding upon the first output signal thereof (phonemes) for providing an output signal having a high-level of information content (syllables). Likewise, module 18 follows the same construction and operation as module 14 receiving the first output signal from module 16 (syllables) and providing an even higher-level of information content (words) at the first output thereof. Accordingly, modules 16 and 18 include delay circuits having delays greater than modules 14 and 16, respectively, typically by a factor of four between each module.

It should be appreciated that the instructive connotations presented herein, i.e. primitive sounds, phonemes, syllables and words, are used to simplify the understanding of the present invention; however, it is not necessary to divide the recognition and synthesis levels of modules 12-18 upon such hard and precise boundaries. The accuracy of the prediction and the degree of information compression is based upon the length of the spatial vector and the delay interval $t_d$, and these parameters may be set at appropriate values commensurate with the design goals.

The output signal of module 18 is applied through host interface 46 to the first input of host computer 24. Host interface 46 comprises an analog-to-digital converter and a digital-to-analog converter whereby the first input signals thereof are adapted for use by host computer 24. Simultaneously, the digital signal provided at the first output of host computer 24 is coupled through host interface 46 to the first terminal of switching circuit 50. During normal recognition operation, the control signal provided at the second output of host computer 24 connects the second and third terminals of switching circuit 50 together whereby the first output signal with the highest level of information content provided at the first output of module 18 is reapplied to the second input of the same via conductor 52. The other position of switching circuit 50 is typically reserved for learning mode or dedicated synthesis mode whereby host computer 24 may supply the high-level information stored in a training file through conductor 52 to the second input of module 18. These training files in cooperation with the first input signal applied at input 20 offer many advantages to simplify the initial training or retraining sequences. Furthermore, such training files could re-configure the weights within modules 12-18 to alter the utility application in a rapid and flexible manner as compared to convention manners such as described in the background of the invention. For example, SPANN 10 need not be dedicated as a voice recognition system, but rather could be automatically retrained as a visual recognition system for patterns varying over time simply by applying the appropriate training file.

It is also possible with SPANN 10 to operate as a dedicated synthesizer. If, for example, the bias voltage applied to the confidence layer of each module, i.e. input 184 of module 12, was increased such that the confidence layer would continuously register the confidence state while high-level input signals were applied to the second input of module 18, then the knowledge base of modules 12-18 would systematically synthesize lower-level output signals ultimately providing a series of low-level signals at output 22 which could drive a speaker and audibly reproduce the high-level "words". Host computer 24 could easily store the high-level signals while SPANN 10 systematically decompressed them through the module hierarchy for producing high quality audio output. For example, the signal symbolic of the word "START" could be applied to the second input of module 18 from which SPANN 10 could generate the waveform of FIG. 2 between times $t_1$ and $t_2$.

It is further understood from the present example that the other module stacks may be interconnected with modules 12-18 in various configurations for providing more sophisticated recognition and synthesis capabilities. Indeed, the present invention is not limited to the speech recognition application as disclosed herein, but rather may encompass many applications wherein a waveform containing identifying features at different time scales must be learned for recognition and synthesis.

Hence, what has been provided is a novel modular approach to artificial neural networks comprising a plurality of serially-coupled modules responsive to first and second input signals wherein the first input signal of each module is systematically delayed for creating a temporal spatial vector from which a lower frequency first output signal is provided symbolic of the information content of the first input signal. Simultaneously, the second high-level input signal is decompressed for providing a synthesized second low-level output signal corresponding to the information content of the second input signal.

We claim:

1. A neural network responsive to first and second input signals applied at first and second inputs for providing first and second output signals at first and second outputs symbolic of the information content thereof, comprising:

first means responsive to the first output signal for providing a prediction of the first input signal of the neural network at an output;

second means having first and second outputs and first and second inputs coupled for receiving the first input signal of the neural network and said prediction of the first input signal respectively for monitoring the correlation between the first input signal and said prediction of the first input signal and gating a signal through said second means to said first output of said second means in response to first and second degrees of correlation between the first input signal and said prediction of the first input signal, wherein the first input signal is gated through to said first output of said second means upon detecting said first degree of correlation and said prediction of the first input signal is gated through to said first and second outputs of said second means upon detecting said second degree of correlation, said second output of said second means being coupled to the second output of the neural network;

third means for progressively delaying said signal gated through said second means to provide a spatial vector of said signal gated through said second means at a plurality of tap points; and fourth means responsive to said spatial vector of said signal gated through said second means and to the second input signal of the neural network for providing the first output signal symbolic of the information content of the first and second input signals.

2. The neural network of claim 1 wherein the first output signal symbolic of the information content of the first and second input signals comprises a plurality of output signals and the second input signal comprises a plurality of input signals.

3. The neural network of claim 2 wherein said first means comprises a first neuron having a plurality of inputs coupled for receiving said plurality of outputs signals of the first output signal and having an output coupled to said second input of said second means.

4. The neural network of claim 3 wherein said first neuron comprises:

a plurality of synapses each having an input respectively coupled for receiving said plurality of outputs signals of the first output signal and having an output for providing a weighted output signal in response thereto; and a summing junction having a plurality of inputs respectively coupled to said outputs of said plurality of synapses and having an output coupled to said output of said first neuron.

5. The neural network of claim 4 wherein said second means comprises:

a first gain controllable amplifier having an input coupled to said first input of said second means and having an output and a gain control input;

a second gain controllable amplifier having an input coupled to said output of said first neuron and an output coupled to said second output of said second means and having a gain control input;

a second neuron having first and second synapses and an output, said first synapse of said second neuron being coupled to said output of said first gain controllable amplifier, said second synapse of said second neuron being coupled to said output of said second gain controllable amplifier, said output of said second neuron being coupled to said first output of said second means for providing said signal gated through said second means as the weighted sum of the signals applied at said first and second synapses; and a third neuron having first and second synapses coupled to said inputs of said first and second gain controllable amplifiers respectively for providing an output signal as the weighted sum of the signals applied thereto for controlling the gain of said first and second gain controllable amplifiers.

6. The neural network of claim 5 wherein said second means further comprises:

an averaging circuit responsive to said output signal of said third neuron for providing an output signal as the time average thereof;

a fourth neuron having first and second synapses and having an output, said first synapse of said fourth neuron being coupled for receiving said output signal of said averaging circuit, said output of said fourth neuron being coupled to said gain control input of said first gain controllable amplifier; and a fifth neuron having first and second synapses and having an output, said first synapse of said fifth neuron being coupled to a power supply conductor, said second synapse of said fifth neuron being coupled to said output of said fourth neuron, said output of said fifth neuron being coupled to said gain control input of said second gain controllable amplifier and to said second synapse of said fourth neuron.

7. The neural network of claim 6 wherein said third means comprises a plurality of serially coupled delay circuits having an input coupled to said output of said second neuron and having a plurality of tap points coupled to said fourth means for providing said spatial vector of said signal gated through said second means.

8. The neural network of claim 7 wherein said fourth means comprises a first plurality of neurons each having a plurality of adaptive synapses coupled for receiving said spatial vector provided at said plurality tap points of said delay circuits and each having a plurality of non-adaptive synapses and an output, said outputs of said first plurality of neurons being respectively coupled to said plurality of inputs of said first neuron.

9. The neural network of claim 8 wherein said outputs of said first plurality of neurons are respectively coupled to said plurality of non-adaptive synapses thereof wherein the weights of said non-adaptive synapses of said first plurality of neurons are assigned in a predetermined manner.

10. The neural network of claim 9 wherein said fourth means further comprises:

a second plurality of neurons each having a plurality of non-adaptive synapses and an output, said plurality of non-adaptive synapses being coupled to a predetermined group of said outputs of said first plurality of neurons, said outputs of said second plurality of neurons being respectively coupled to predetermined ones of said plurality of output signals of the first output signal symbolic of the information content of the first and second input signals; and a third plurality of neurons each having a plurality of non-adaptive synapses and an output, said plurality of non-adaptive synapses being coupled to said plurality of inputs of the second input signal, said outputs of said third plurality of neurons being respectively coupled to predetermined ones of said plurality of non-adaptive synapses of said first plurality of neurons.

11. The neural network of claim 10 wherein said one of said first plurality of neurons comprises a summing junction having a plurality of inputs respectively coupled to said outputs of said plurality of adaptive and non-adaptive synapses and having an output coupled to said output of one of said first plurality of neurons.

12. The neural network of claim 11 wherein said one of said plurality of non-adaptive synapses of said first plurality of neurons comprises a resistor coupled between the input of said one of said plurality of non-adaptive synapses and one of said plurality of inputs of said summing junction.

13. The neural network of claim 12 wherein one of said plurality of adaptive synapses of one of said first plurality of neurons comprises:

a first transistor having a drain, a source and a gate, said drain being coupled to the input of said one of said plurality of adaptive synapses, said source being coupled to one of said plurality of inputs of said summing junction;

a comparator having first and second inputs and an output, said first input of said comparator being coupled to said drain of said first transistor;

a scaling circuit coupled between said gate of said first transistor and said second input of said comparator for adjusting the potential therebetween;

a first switching circuit having first and second conduction terminals and having a control input, said first conduction terminal being coupled to a first source of operating potential, said control input being coupled to said output of said comparator;

a second switching circuit having first and second conduction terminals and having a control input, said first conduction terminal of said second switching circuit being coupled to said second conduction terminal of said first switching circuit, said second conduction terminal of said second switching circuit being coupled to a second source of operating potential; and an inverter coupled between said output of said comparator and said control input of said second switching circuit.

14. The neural network of claim 13 wherein one of said plurality of adaptive synapses of said first plurality of neurons further comprises:
- a third switching circuit having first and second conduction terminals and having a control input, said first conduction terminal of said third switching circuit being coupled to said second terminal of said first switching circuit;
- a second transistor having a drain, a source and a gate, said source of said second transistor being coupled to a third source of operating potential, said gate of said second transistor being coupled to said second terminal of said third switching circuit, said drain of said second transistor being coupled to said gate of said first transistor;
- a third transistor having a drain, a source and a gate, said drain and said gate of said third transistor being coupled together to a fourth source of operating potential, said source of said third transistor being coupled to said drain of said second transistor;
- a fourth switching circuit having first and second conduction terminals and having a control input, said first conduction terminal of said fourth switching circuit being coupled to said control input of said third switching circuit; and
- a multiplier circuit having first and second inputs and an output, said first input of said multiplier circuit being coupled to said output of said fourth neuron, said second input of said multiplier circuit being coupled to said output of one of said first plurality of neurons, said output of said multiplier circuit being coupled to said control input of said fourth switching circuit.

15. The neural network of claim 14 further comprising an oscillator having an output coupled to said second conduction terminal of said fourth switching circuit for providing an output signal having a predetermined frequency.

16. The neural network of claim 1 wherein said first degree of correlation indicates a degree of difference between the first input signal and said prediction of the first input signal.

17. The neural network of claim 16 wherein said second degree of correlation indicates a degree of similarity between the first input signal and said prediction of the first input signal.

18. A neural network comprising a plurality of serially coupled modules each being responsive to first and second input signals applied at first and second inputs for providing first and second output signals at first and second outputs symbolic of the information content thereof, wherein the first output and the second input of a first one of the plurality of serially coupled modules are respectively coupled to the first input and the second output of a second one of the plurality of serially coupled modules for increasing the recognition capacity thereof, each module comprising:
- first means responsive to the first output signal for providing a prediction of the first input signal of the neural network at an output;
- second means having first and second outputs and first and second inputs coupled for receiving the first input signal of the neural network and said prediction of the first input signal respectively for monitoring the correlation between the first input signal and said prediction of the first input signal and gating a signal through said second means to said first output of said second means in response to first and second degrees of correlation between the first input signal and said prediction of the first input signal, wherein the first input signal is gated through to said first output of said second means upon detecting said first degree of correlation and said prediction of the first input signal is gated through to said first and second outputs of said second means upon detecting said second degree of correlation, said second output of said second means being coupled to the second output of the neural network;
- third means for progressively delaying said signal gated through said second means to provide a spatial vector of said signal gated through said second means at a plurality of tap points; and
- fourth means responsive to said spatial vector of said signal gated through said second means and to the second input signal of the neural network for providing the first output signal symbolic of the information content of the first and second input signals.

19. The neural network of claim 18 wherein said first degree of correlation indicates a degree of difference between the first input signal and said prediction of the first input signal.

20. The neural network of claim 19 wherein said second degree of correlation indicates a degree of similarity between the first input signal and said prediction of the first input signal.

21. The neural network of claim 20 wherein the first output signal symbolic of the information content of the first and second input signals comprises a plurality of output signals and the second input signal comprises a plurality of input signals.

22. The neural network of claim 21 wherein said first means comprises a first neuron having a plurality of inputs coupled for receiving said plurality of outputs signals of the first output signal and having an output coupled to said second input of said second means.

23. The neural network of claim 22 wherein said first neuron comprises:
- a plurality of synapses each having an input respectively coupled for receiving said plurality of outputs signals of the first output signal and having an output for providing a weighted output signal in response thereto; and
- a summing junction having a plurality of inputs respectively coupled to said outputs of said plurality of synapses and having an output coupled to said output of said first neuron.

24. The neural network of claim 23 wherein said second means comprises:
- a first gain controllable amplifier having an input coupled to said first input of said second means and having an output and a gain control input;
- a second gain controllable amplifier having an input coupled to said output of said first neuron and an output coupled to said second output of said second means and having a gain control input;
- a second neuron having first and second synapses and an output, said first synapse of said second neuron being coupled to said output of said first gain controllable amplifier, said second synapse of said second neuron being coupled to said output of said second gain controllable amplifier, said output of said second neuron being coupled to said first output of said second means for providing said signal gated through said second means as the weighted sum of the signals applied at said first and second synapses; and a third neuron having first and second synapses coupled to said inputs of said first and second gain controllable amplifiers respectively for providing an output signal as the weighted sum of the signals applied thereto for controlling the gain of said first and second gain controllable amplifiers.

25. The neural network of claim 24 wherein said second means further comprises:

an averaging circuit responsive to said output signal of said third neuron for providing an output signal as the time average thereof;

a fourth neuron having first and second synapses and having an output, said first synapse of said fourth neuron being coupled for receiving said output signal of said averaging circuit, said output of said fourth neuron being coupled to said gain control input of said first gain controllable amplifier; and a fifth neuron having first and second synapses and having an output, said first synapse of said fifth neuron being coupled to a power supply conductor, said second synapse of said fifth neuron being coupled to said output of said fourth neuron, said output of said fifth neuron being coupled to said gain control input of said second gain controllable amplifier and to said second synapse of said fourth neuron.

26. The neural network of claim 25 wherein said third means comprises a plurality of serially coupled delay circuits having an input coupled to said output of said second neuron and having a plurality of tap points coupled to said fourth means for providing said spatial vector of said signal gated through said second means.

27. The neural network of claim 26 wherein said fourth means comprises a first plurality of neurons each having a plurality of adaptive synapses coupled for receiving said spatial vector provided at said plurality tap points of said delay circuits and each having a plurality of non-adaptive synapses and an output, said outputs of said first plurality of neurons being respectively coupled to said plurality of inputs of said first neuron.

28. The neural network of claim 27 wherein said outputs of said first plurality of neurons are respectively coupled to said plurality of non-adaptive synapses thereof wherein the weights of said non-adaptive synapses of said first plurality of neurons are assigned in a predetermined manner.

29. The neural network of claim 28 wherein said fourth means further comprises:

a second plurality of neurons each having a plurality of non-adaptive synapses and an output, said plurality of non-adaptive synapses being coupled to a predetermined group of said outputs of said first plurality of neurons, said outputs of said second plurality of neurons being respectively coupled to predetermined ones of said plurality of output signals of the first output signal symbolic of the information content of the first and second input signals; and a third plurality of neurons each having a plurality of non-adaptive synapses and an output, said plurality of non-adaptive synapses being coupled to said plurality of inputs of the second input signal, said outputs of said third plurality of neurons being respectively coupled to predetermined ones of said plurality of non-adaptive synapses of said first plurality of neurons.

30. The neural network of claim 29 wherein said one of said first plurality of neurons comprises a summing junction having a plurality of inputs respectively coupled to said outputs of said plurality of adaptive and non-adaptive synapses and having an output coupled to said output of one of said first plurality of neurons.

31. The neural network of claim 30 wherein said one of said plurality of non-adaptive synapses of said first plurality of neurons comprises a resistor coupled between the input of said one of said plurality of non-adaptive synapses and one of said plurality of inputs of said summing junction.

32. The neural network of claim 31 wherein one of said plurality of adaptive synapses of one of said first plurality of neurons comprises:

a first transistor having a drain, a source and a gate, said drain being coupled to the input of said one of said plurality of adaptive synapses, said source being coupled to one of said plurality of inputs of said summing junction;

a comparator having first and second inputs and an output, said first input of said comparator being coupled to said drain of said first transistor;

a scaling circuit coupled between said gate of said first transistor and said second input of said comparator for adjusting the potential therebetween;

a first switching circuit having first and second conduction terminals and having a control input, said first conduction terminal being coupled to a first source of operating potential, said control input being coupled to said output of said comparator;

a second switching circuit having first and second conduction terminals and having a control input, said first conduction terminal of said second switching circuit being coupled to said second conduction terminal of said first switching circuit, said second conduction terminal of said second switching circuit being coupled to a second source of operating potential; and an inverter coupled between said output of said comparator and said control input of said second switching circuit.

33. The neural network of claim 32 wherein one of said plurality of adaptive synapses of said first plurality of neurons further comprises:

a third switching circuit having first and second conduction terminals and having a control input, said first conduction terminal of said third switching circuit being coupled to said second terminal of said first switching circuit;

a second transistor having a drain, a source and a gate, said source of said second transistor being coupled to a third source of operating potential, said gate of said second transistor being coupled to said second terminal of said third switching circuit, said drain of said second transistor being coupled to said gate of said first transistor;

a third transistor having a drain, a source and a gate, said drain and said gate of said third transistor being coupled together to a fourth source of operating potential, said source of said third transistor being coupled to said drain of said second transistor;

a fourth switching circuit having first and second conduction terminals and having a control input, said first conduction terminal of said fourth switching circuit being coupled to said control input of said third switching circuit; and a multiplier circuit having first and second inputs and an output, said first input of said multiplier circuit being coupled to said output of said fourth neuron, said second input of said multiplier circuit being coupled to said output of one of said first plurality of neurons, said output of said multiplier circuit being coupled to said control input of said fourth switching circuit.

34. The neural network of claim 33 further comprising an oscillator having an output coupled to said second conduction terminal of said fourth switching circuit for providing an output signal having a predetermined frequency.

* * * * *